Sept. 8, 1970     C. GRANT     3,526,958
FINNED SURFACE ELECTRICAL HEATING UNIT AND METHOD OF MAKING SAME
Filed Sept. 19, 1967     4 Sheets-Sheet 1
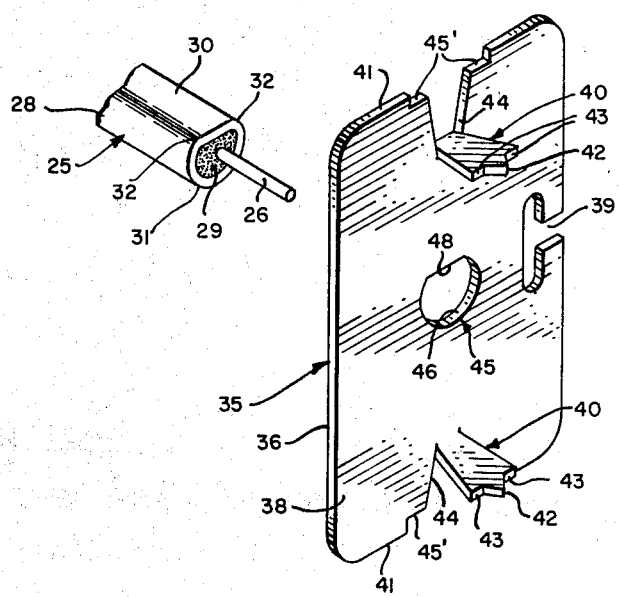
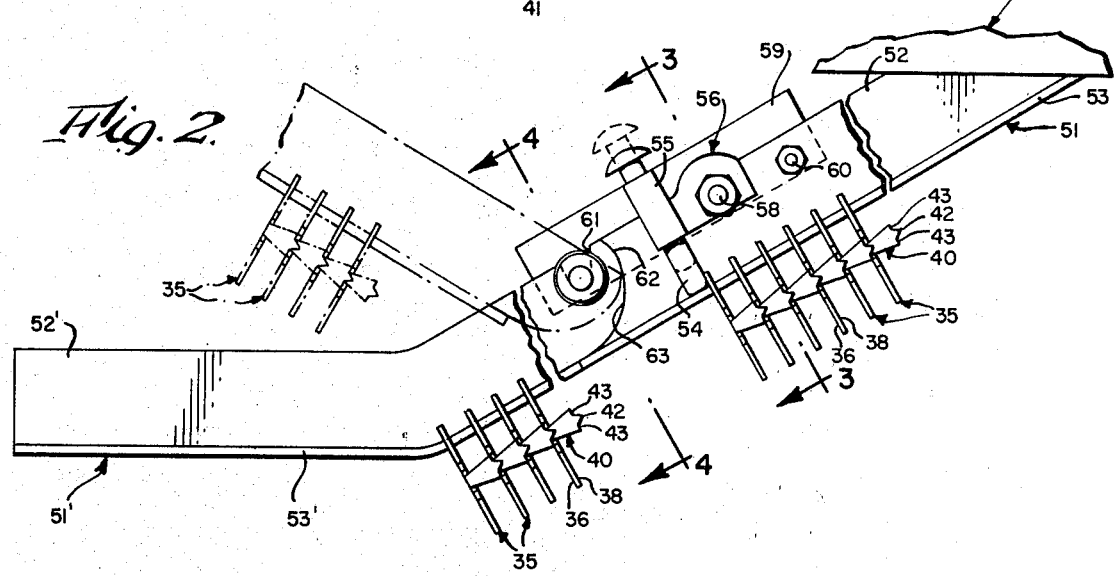
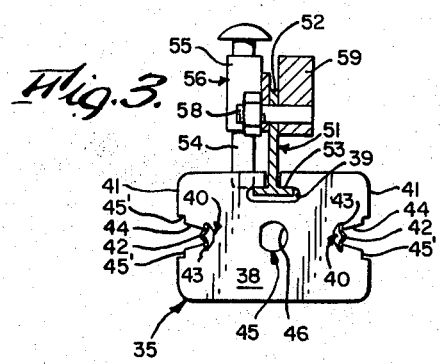
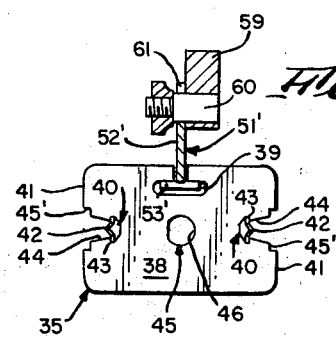
INVENTOR.
Cuthbert Grant
BY
Popp and Sommer
ATTORNEYS Sept. 8, 1970 C. GRANT 3,526,958
FINNED SURFACE ELECTRICAL HEATING UNIT AND METHOD OF MAKING SAME
Filed Sept. 19, 1967 4 Sheets-Sheet 2
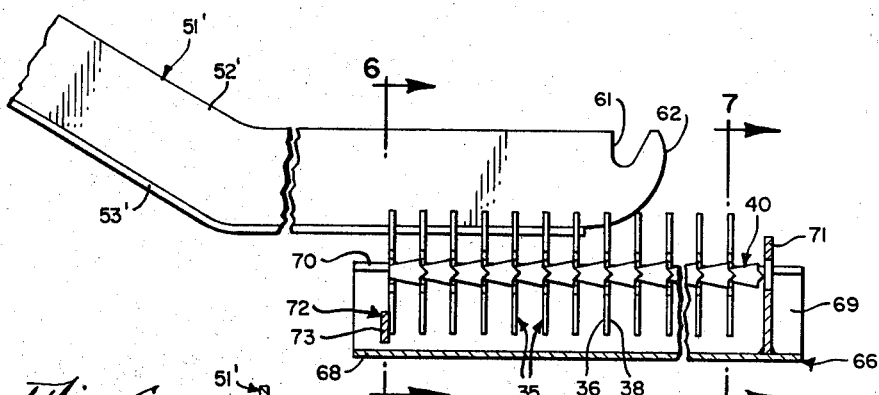
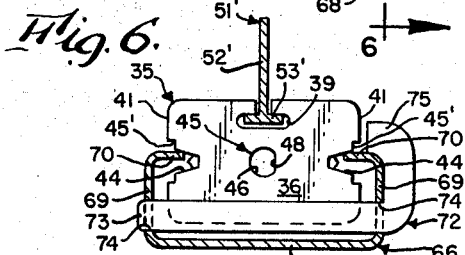
INVENTOR.
Cuthbert Grant
BY
Popp and Somme
ATTORNEYS

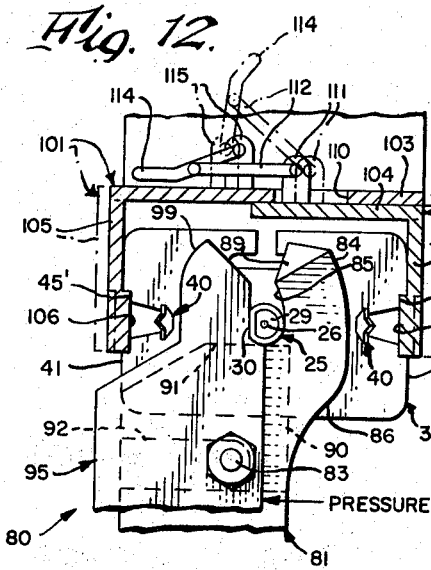

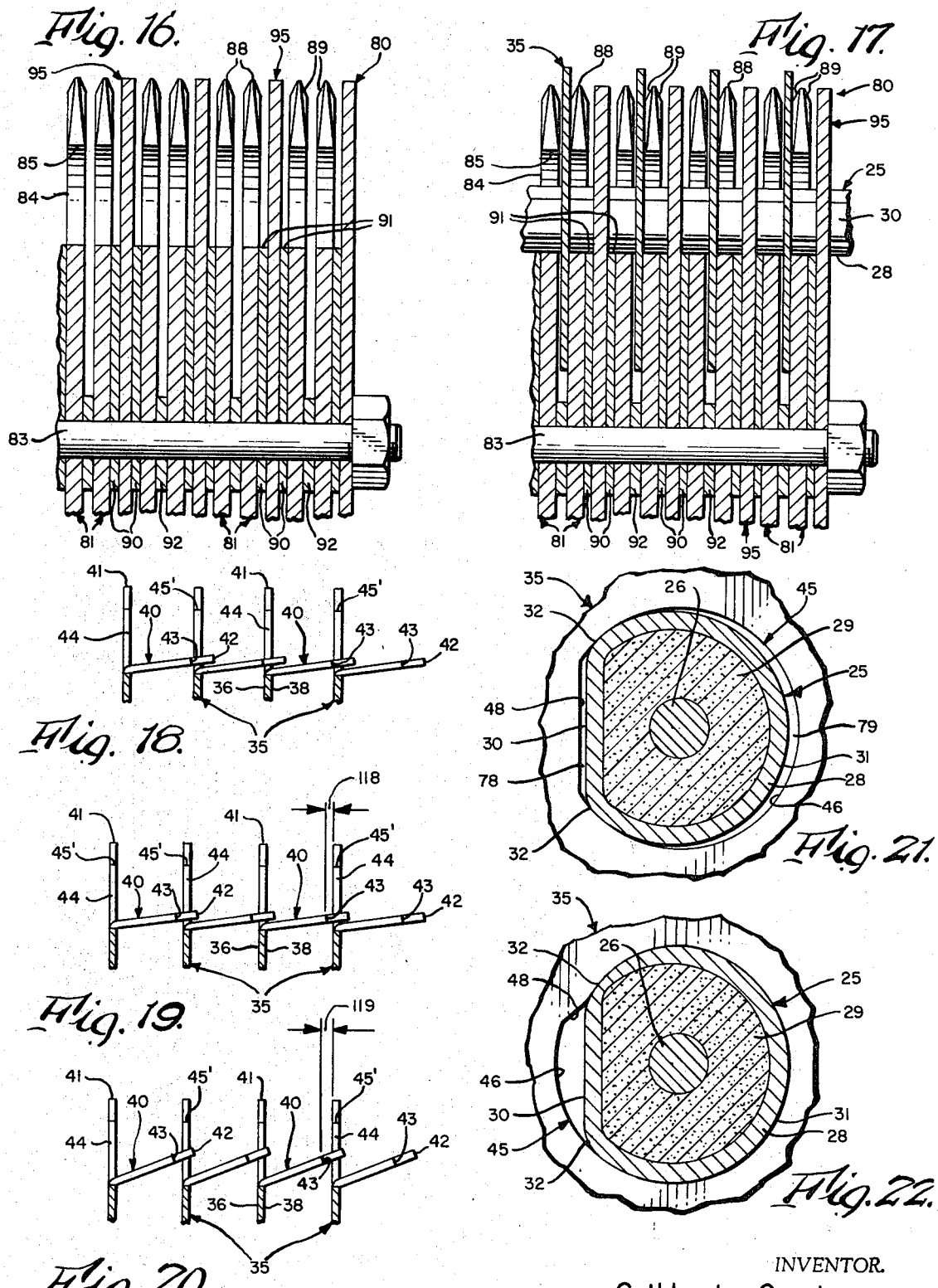

_United States Patent Office_

3,526,958
Patented Sept. 8, 1970

3,526,958
FINNED SURFACE ELECTRICAL HEATING UNIT
AND METHOD OF MAKING SAME
Cuthbert Grant, Williamsville, N.Y., assignor to Markel
Electric Products, Inc., Buffalo, N.Y., a corporation of
New York
Filed Sept. 19, 1967, Ser. No. 668,841
Int. Cl. H05b 3/00
U.S. Cl. 29—611                                10 Claims

ABSTRACT OF THE DISCLOSURE

On a metal tubular sheath containing a resistance heating wire, spaced transverse fin plates are provided without solder or necking by making the sheath D-shaped in cross section; providing similar D-shaped holes in the fin plates; threading the fin plates on the sheath in uniformly spaced relation; and turning the fin plates relative to the sheath about its axis to effect pressure and good thermal conductivity contact between the greater part of the D-shaped edge of each fin plate and the periphery of the sheath. The fin plates are spaced from each other by spacing tabs on each plate which initially engage the side of an adjacent fin plate, but which are subsequently moved out of such contact so that the only fin plate-to-fin plate connection is through the above pressure and thermal contacts with the sheath, and the spacing tabs cannot produce noise as the unit expands and contracts thermally.

---

FIG. 1 is an enlarged exploded perspective view of a heating element or rod and a fin plate in position to be applied thereto. FIG. 2 is a fragmentary side elevational view of the discharge end of a punch press and in particular illustrating the fixed and removable T-bar tracks, the fin plates produced by the punch press being gathered on the fixed T-bar track as a group in spaced relation to one another, and then being transferred to the removable T-bar section to be transported to the next operation. FIGS. 3 and 4 are sections taken on the correspondingly numbered lines of FIG. 2. FIG. 5 is a fragmentary vertical section through a channel-shaped fixture used to hold the spaced group of fin plates and showing the manner in which the same is used in conjunction with the removable T-bar rail. FIGS. 6 and 7 are sections taken on the correspondingly numbered lines of FIG. 5. FIG. 8 is a section taken generally on line 8—8, FIG. 7 but showing a heating rod having been inserted through the group of fin plates in the channel-shaped fixture. FIG. 9 is a vertical transverse section through a part of a machine for effecting a pressure union between the heating rod and each fin plate which forms the extended surface thereof, the parts being positioned in FIG. 9 to receive the array of fin plates and their supporting heating rod. FIG. 10 is a view similar to FIG. 9 showing the array of fin plates and their supporting heating rod positioned to have the latter clamped against turning about its axis. FIG. 11 is a view similar to FIGS. 9 and 10 but showing the parts positioned with the heating rod clamped against turning about its axis. FIG. 12 is a view similar to FIG. 11 but showing a clamping fixture applied to the edges of the group of fin plates. FIG. 13 is a view similar to FIG. 12 showing the clamping fixture rotated 50° about the axis of the heating rod so as to effect the union between the heating rod and the several fin plates in accordance with the present invention. FIG. 14 is a view identical with FIG. 13 but with the heating rod clamping elements released. FIG. 15 is a view similar to FIG. 14 with the clamping fixture swung back to the position illustrated in FIG. 12 and with a pry applied to one side thereof to lift it and the completed extended surface unit contained therein from the machine. FIG. 16 is an enlarged fragmentary vertical section taken on line 16—16, FIG. 11 prior to receiving the array of heating rod and its fin plates. FIG. 17 is a view similar to FIG. 16 but showing the array of heating rod and fin plates inserted in position in the turning machine. FIGS. 18, 19 and 20 are enlarged fragmentary sections through one side of a group of fin plates and in particular showing in side elevational view the spacing tabs thereof, FIG. 18 showing these tabs contacting the next succeeding fin plates and operative to effect initial spacing of the fin plates; FIG. 19 showing the fin plates separated from one another a short distance to bring these spacing tabs out of operative contact; and FIG. 20 showing these spacing tabs forced apart to toe out to a greater degree and to be still further away from operative contact with an adjacent fin plate. FIG. 21 is a greatly enlarged section through the heating rod with a fin plate threaded thereon and prior to effecting a pressure union therebetween in accordance with the present invention. FIG. 22 is a view similar to FIG. 21 showing the position of the parts after a pressure union has been effected between the heating rod and each fin plate in accordance with the present invention.

The extended surface heating unit made in accordance with the present invention has a conventional electrical resistance heating rod 25 in the form of a length of resistance wire 26 housed within a tubular metal sheath 28 with which it is held in centered relation by a hardened filler 29 of magnesium oxide. An initial step in the present invention, as best shown in FIGS. 1 and 21, comprises forming a flat 30 longitudinally along one side of the sheath so that the heating rod is D-shaped in external cross section, having a semi-cylindrical surface 31 on its side opposite the flat 30. In so rolling the flat 30, bulges 32 are produced longitudinally on the sheath beyond the longitudinal edges of the flat 30. These bulges merge into the semicylindrical face 31 to produce a rounding face on the side of the sheath opposite the flat 30. The chordal extent of this flat 30 is more than 45° and not more than 90° of the circumference of the sheath.

The extended surface of each unit is provided by a plurality of individual metal fin plates 35 surrounding the sheath 25 and projecting transversely therefrom in spaced relation to one another. Each fin plate is in the form of a flat metal plate with its opposite faces 36, 38 parallel with each other and of any outline, a rectangular outline with rounding corners being shown. For the purpose of initially assembling the fin plates into a procession or group, each is provided along one edge with a T-shaped slot 39 and to initially hold the several fin plates of this group in uniformly spaced relation to one another, each is provided with a pair of spacing tabs 40, projecting laterally from one flat face, such as the face 38. These spacing tabs can be of any suitable form and are shown as being struck from opposite end edges 41 of each fin plate so as to toe out, as best shown in FIG. 1. Desirably the form of each of these spacing tabs 40 is such as to have a central end point 42 projecting outwardly from between abrupt end shoulders 43 which later form the actual stops in the functioning of the spacing tabs as hereinafter described. These spacing tabs are struck from each fin plate to leave a pair of opposite edge notches 44 and each of these notches is flanked by a pair of secondary edge notches 45′ which are of rectangular form, for a purpose which will presently appear.

A further feature of the invention is that, between the two spacing tabs 40, each fin plate 35 is provided with an out-of-round hole 45 which generally conform to the out-of-round external cross sectional shape of the sheath 28 and hence is of D-shaped outline. Each hole 45 therefore has a generally circular portion 46 terminating in a straight portion 48 which conforms to and is adapted to fit conformingly around the semi-cylindrical part 31, flat 30 and slight bulges 32 of the sheath, the chordal extent of the straight edge 48 being therefore not less than 45° nor more than 90° of the total circumference of the hole 45.

The fin plates 35 as illustrated in FIG. 1 are produced in a punch press indicated generally at 50 and are discharged onto a rigid inclined T-bar 51, this T-bar having a vertical central web 52 and laterally extending bottom flanges 53 which web and flanges conform to the T-shaped slots 39, inverted, so as to support a progression or row of the fin plates 35 in the manner illustrated in FIGS. 2–4. This group of fin plates coming from the punch press 50 builds up against the lower end of an abutment pin 54. As best shown in FIGS. 2 and 3 this abutment pin is slidingly mounted in a tubular guideway 55 of a holder 56 which is secured to the web 52 of the T-bar 51 by a stud bolt 58, or in any other manner, and the lower end of this pin 54 is in the path of the fin plates 35 sliding down the stationary inclined T-bar 51 from the punch press 50.

To the lower end of the inclined T-bar 51 is removably secured a continuation 51' thereof, this continuation being also of inverted T-form in cross section having a vertical web 52' and bottom side flanges 53' along which web and flanges the group of fin plates 35 slide when the abutment pin 54 is lifted. Any means can be provided for removably supporting the T-bar extension 51' at the lower end of the stationary inclined T-bar 51, such means being shown as comprising a block 59 fixed to one side of the vertical web 52 of the inclined stationary T-bar 51 and having a horizontal pin 60 at its outboard end projecting into a notch 61 at the corresponding end of the removable T-bar section 51'. The end 62 of the web 52' of the removable T-bar section 51' is of rounding form in elevation and fits in the correspondingly recessed lower end 63 of the web 52 of the stationary inclined T-bar 51 so, that the webs and flanges of the T-bar sections 51, 51' are in line with each other but so that the removable extension 51' can be removed by simply lifting its outboard end and removing its notch 61 from the pin 60.

In gathering at the lower end of the T-bar section 51 the progression of fin plates 35 arrange themselves in uniformly spaced relation to one another by virtue of their spacing tabs 40. Thus, since each of these spacing tabs toe out with reference to each other, the points 42 thereof enter the edge notches 44 of the next succeeding trailing fin plate 35 and their abrupt end shoulders 43 engage the face 36 of this trailing fin plate on opposite sides of these edge notches 44. When the group of fin plates 35 are caused to slide down onto the removable T-bar section 51', this spacing of the group of fin plates 35 by their spacing tabs 40 is maintained so that the full complement of fin plates 35 on the removable T-bar section 51' are held in uniformly spaced relation to one another.

The removed T-bar section 51', together with the full complement of uniformly spaced fin plates 35 thereon, is then shoved longitudinally into a holding fixture indicated generally at 66. This fixture 66 is of open ended channel shape form in cross section having a bottom wall 68, side walls 69 and top flanges 70 which extend from the upper edges of the side walls 69 in opposing relation to each other and which fit into the edge notches 44 of the progression of uniformly spaced fin plates 35 when the loaded T-bar section 51' is shoved lengthwise of the holding fixture 66 with the fin plates 35 in line with its inlet end 67.

The longitudinal movement of the T-bar section 51' with its complement of uniformly spaced fin plates 35, is stopped by engagement of the tabs 40 of the leading fin plate 35 with a transverse stop wall 71 in the far end of the holding fixture 66. After the T-shaped holder 51' has been so moved endwise of the holding fixture 66 to insert its complement of fin plates therein and with the tabs 40 of the leading fin plate 35 in engagement with the stop wall 71, the group of fin plates 35 are latched in position in the holding fixture by means of a slide or key 72, this slide or key including a flat stem 73 inserted in slots 74 in the opposite side walls 69 of the holding fixture, these slots being positioned immediately in rear of the trailing fin plate 35 of the full complement of fin plates in the holding fixture. Exteriorly of the holding fixture the latching slide or key 72 is provided with an upright finger piece 75 to facilitate insertion and removal thereof. Of course, the pairs of slots 74 can be provided at a plurality of locations along the holding fixture 66 so that units of different length can be assembled in the same holding fixture 66.

When so positioned in the fixture 66 the holes 45 of the several fin plates 35 therein are all in line with each other and with their straight edges 48 on the same side. Accordingly it is easy at this time to insert the sheath 28 of the heating rod 25, this being inserted endwise through the several holes 45 and with its flat 30 conforming to the straight edges 48 of the several fin plates. The fit of the sheath 28 in the several holes 45 of the row of fin plates 35 in the holding fixture 66 is illustrated in FIG. 21 from which it will be noted that the bulges 32 are in substantial contact with the rounding edge 46 of each fin plate hole 45 and that a slight clearance 78 exists between the flat 30 of the sheath 28 and the straight edges 48 of the row of plates and that also a slight clearance 79 exists between the semi-circular rounding face 31 of the heating rod sheath 28 and the rounding fin plate edges 46.

The gang of spaced fin plates 35 in the holding fixture 66 through which the heating tube 25 has been so inserted is then applied, transversely, to a turning machine indicated generally at 80 and which performs three functions. The first function is to space the entire gang of fin plates 35 further apart so as to move their spacing tabs 40 out of contact with the faces 36 of the next succeeding fin plates, such spacing of the spacing tabs being indicated in FIG. 19. The second function of this turning machine is to hold the heating rod 25 stationary while turning the gang of fin plates 35 as a group around the axis of this rod for approximately 50° to effect a good pressure and thermal conductivity union between each fin plate and the periphery and the tubular sheath 28. The third function is to spread apart the pair of spacing tabs 40 of each fin plate so as to move them further away from contact with the face 36 of the adjacent fin plate, this poistion of these tabs being illustrated in FIG. 20.

The machine 80 is shown as having a row of fixed upright parallel cam plates 81 which are transversely spaced from one another. These fixed cam plates can be mounted in any suitable manner to project upwardly from a base (not shown) and jointly carry a pivot rod or bolt 83 which extends perpendicularly through all of the fixed plates 81 near but spaced from the top ends thereof. At one side each of the fixed cam plates is formed to provide a flat coplanar extension 84 which projects first laterally from and then longitudinally upwardly beyond the end of each fixed cam plate. At its base and on its edge facing a vertical plane intersecting the pivot rod or bolt 83 each of these extensions 84 is rounded as indicated at 85 to fit part of the rounded face 31 of the heating rod 25 and this base portion of its opposite edge is rounded to form a salient cam edge 86 for bending a corresponding one of the spacing tabs 40 as hereinafter described. The outer end 88 of each extension 84 is preferably of the pointed form shown and the opposite side faces 89 of each pointed end 88 diverge downwardly and outwardly to provide cam faces at the pointed end of each stationary cam plate 81 which cam faces serve to spread apart the fin plates 35 released from the holding fixture 66 into the turning machine 80.

The turning machine is shown as having a row of fixed upright parallel spacing plates 90 arranged between successive pairs of the fixed cam plates 81. These fixed upright spacing plates 90 are also penetrated by the bolt or pivot rod 83 and each has a top straight edge 91 which is in a horizontal plane intersecting the lower ends of the curving edges 85 of the upward extensions 84 of the upright fixed cam plates 81.

The machine is shown as having another row of fixed upright parallel spacing plates 92 which are also penetrated by the bolt or pivot pin 83 and can be of any form in elevation, being shown as of rectangular form in elevation and arranged horizontally on the pivot rod or bolt 83. Between each pair of these stationary spacer plates 90, is journalled a movable plate 95, these movable plates being in alignment in a row along the pivot rod 83 in parallel relation to one another. Each of these vertical movable plates 95 has a straight edge 96 facing in the direction of the upright extensions 84 of the fixed upright cam plates 81 and adapted to be brought to an upright position to engage the flat 30 of the tubular sheath 28 of the heating rod 25, the lower end of this straight edge terminating in a curved edge 98 which, when gripping a heating rod 25, as shown in FIGS. 11–14, engages a part of the rounding surface 31, 32 of this heating rod.

The edge 99 of each movable upright plate 95 opposite from its straight edge 96 is in the form of a salient cam face which is adapted to engage and bend the corresponding tab 40 away from its companion tab 40 as hereinafter described.

The group of these movable plates 95 are swung as a unit by any suitable means (not shown) from an open position, shown in FIGS. 9 and 10, to a closed position, shown in FIGS. 11–14 in which closed position they clamp the D-shaped heating rod 25 of the heating unit being formed, against the edges 85 of the upward extensions 84 of the upright fixed cam plates 81.

While the heating rod 25 is so clamped between the group of upright cam plates 81 and movable upright plates 95, means are provided for turning the entire group of fin plates 35 about the axis of the heating rod 25. Such means are shown as being in the form of a clamping fixture 100 having a first bar 101 which is L-shaped in cross section and a second bar 102 which is also L-shaped in cross section, the top flange 103 of the first L-shaped or angle bar 101 slidingly resting on the top flange 104 of the second L-shaped or angle bar 102. The upright flange 105 of the first angle bar 101 is adapted to engage the corresponding slotted end edges 41 of the group of fin plates 35 and is provided with a rib 106 which is formed to enter the notches 45' of these fin plates. Similarly the vertical flange 108 of the second angle bar 102 is provided with a rib 109 which is adapted to enter the notches 45' at the opposite side of the group of fin plates 35. The two angle bars 101, 102 can be spread to an inoperative position preparatory to being clamped around the group of fin plates 35 and then brought together to clamp this group of fin plates with their ribs 106, 109 within the notches 45' on opposite sides of the fin plates. For the purpose of so spreading and contracting these angle bars 101, 102, the top flange 103 of the angle bar 101 is shown as provided with a plurality of spaced transverse slots 110 and the top flange 104 of the second angle bar 102 has a stud 111 projecting up through each of these slots 110. To the upper end of each stud 111 is pivoted a link 112 and the opposite end of each link 112 is pivoted a hand lever 114 which in turn is pivoted to the upper end of a stud 115 projecting upwardly from the top flange 103 of the angle bar 101. The pivotal connection between the link 112 and hand lever 114 swings beyond dead center of the pivotal connection between this lever 114 and the stud 115 from the closed or clamping position shown by full lines in FIG. 12 to the open position shown by dotted lines in this figure.

In addition to its mount for swinging about the axis of the heating rod 25, the clamping fin plate fixture 100 is also mounted so as to be retractable vertically from the group of fixed and movable upright plates of the turning machine 80 so as to permit of loading and unloading the machine. This latter mounting for vertical movement forms no part of the present invention and hence has not been illustrated.

A pry 116, FIG. 15, is also used to remove a finished unit, clamped in the clamping fixture 100, from among the fixed and movable plates of the turning machine 80.

OPERATION

Preparatory to assembling, the heating rod 25, which is initially produced in cylindrical form, has the longitudinal flat 30 rolled along one side thereof, this forming the metal sheath 28 of this heating rod 25 into D-shaped form in external cross section. In addition, such rolling produces the rounding longitudinal bulges 32 at the longitudinal extremities of the flat 30 and which project outwardly from the otherwise semi-cylindrical external surface 31 of the sheath 28.

The fin plates 35 are produced in rapid succession in the punch press 50. In this press they are provided with the central D-shaped holes 45; the T-shaped slots 39 along one longitudinal edge thereof; the notches 44 along the opposite end edges 41 thereof and the material from which is used to produce the spacing tabs 40, these spacing tabs being formed to toe out as illustrated in FIG. 1 and having central pointed ends 42 flanked by abrupt end shoulders 43. In addition each notch 44 is flanked by a pair of small rectangular notches 45'.

The fin plates 35 so formed in the punch press 50 are fed onto the stationary T-bar 51 this T-bar being received in the T-shaped slot 39 of each of these fin plates 35. The progession of fin plates 35 slide down the fixed T-bar 51, the leading fin plate being stopped by the manually removable pin 54 and the succeeding fin plates lining up in spaced relation to this leading fin plate and in spaced relation to each other by virtue of the spacing tabs 40. Thus the pointed end 42 of each of these spacing tabs enters the notch 44 of the next following fin plate 35 and its abrupt shoulders 43 contact the leading face 36 of this next succeeding fin plate. This spacing of the fin plates 35 from one another is illustrated in FIG. 18.

When a sufficient quantity of the fin plates 35 have gathered on the fixed T-bar 51 the movable T-bar 51' is swung down from the dotted line position shown in FIG. 2 to the full line position there shown so as to form an end continuation of this fixed T-bar 51. When so positioned the operator manually lifts the pin 54 so as to release the group of fin plates 35 on the fixed T-bar 51 and permit them to slide, as a group, down onto the movable T-bar 51'. The operator then releases the manual pin 54 and removes the movable T-bar 51' from the lower end of the fixed T-bar 51, this movable T-bar now containing a progression of fin plates 35 corresponding in number to the desired length of the finished heating unit.

The loaded removable T-bar 51' is then used to load its complement of fin plates 35 into the U-shaped channel fixture 66 from the inlet end 67 of the latter. For this purpose the key 72 is removed and the row of fin plates 35 suspended from the removable T-bar 51' is lined up with the open end 67 of the U-shaped channel fixture and shoved into the same. As the group of fin plates is so shoved into the U-shaped channel fixture 66, the opposing flanges 70 of the fixture serve as rails for the fin plates, these flanges entering the notches 44 and supporting the fin plates from the now upper edges of these notches, as best shown in FIGS. 6 and 7. The leading fin plate 35 is stopped by the end wall 71 of the holding fixture 66, as shown in FIG. 5, and after the fixture has received a full load of the fin plates, the shank 73 of the key 72 is passed through the slots 74 at the inlet end 67 of the fixture. With such full load of the fin plates, this key 72 engages the rearmost of the inserted fin plates and serves to retain the entire group of fin plates in the holding fixture, these fin plates still being uniformly spaced by virue of the pair of spacing tabs 40 of each fin plate 35 being in engagement with the opposing face 36 of the next succeeding fin plate 35.

As the next step, the heating rod 25 is inserted endwise through the aligned holes 45 of the group of fin plates in the channel-shaped holding fixture 66. In such insertion the longitudinal flat 30 along one side of this heating rod passes along the straight edges 48 of the holes 45 in the several fin plates as best shown in FIGS. 8 and 21. Following this the shank 73 of the key 72 is removed from the inlet end 67 of the channel-shaped holding fixture 66; the heating rod 25 is held at its opposite ends; and the entire assembly of fin plates on this rod removed endwise from the channel-shaped holding fixture 66 and placed against the top of the several upright stationary and movable plates of the turning machine 80 as best shown in FIG. 9. As shown in this figure, the flat 30 of the heating rod 25 faces to the left but the array of fin plates 35 thereon is preferably brought down at the angle shown in this figure so that each fin plate 35 is brought between the pointed ends 88 of a pair of the fixed upright cam plates 81 and in contact with the cam surfaces 89 thereof. Accordingly, as the array of fin plates on the heating rod 25 are pressed downwardly to the position shown in FIG. 17, the fin plates are moved lengthwise of the heating rod to a slight degree and are respaced by the spacing of the cam surfaces 89 of stationary upright cam plates 81 of the turning machine 80. As a result of this operation the fin plates 35 are respaced in the position illustrated in FIG. 19, that is, the ends of the spacing tabs 40 are brought a short distance out of contact with the faces 36 of the next succceeding fin plate 35. This space is indicated at 118 in FIG. 19.

When fully inserted in the turning machine 80, as illustrated in FIGS. 10 and 17, the bottom of the curving face 31, 32 of the heating rod 25 is in engagement with the rounding bottom part 85 of that side of the upward extension 84 of the fixed upright cam plates 81 which faces toward a vertical plane intersecting the pivot rod 83 of the turning machine.

The entire gang of movable plates 95 are the swung clockwise, around the pivot rod or bolt 83, as viewed in FIGS. 10 and 11, so as to swing these movable plates from the position shown in FIG. 10 to the position shown in FIG. 11. In this latter position it will be noted that the edges 96 of the several upright movable plates 95 come into engagement with the flat 30 of the heating rod 25 and a clamping pressure is exerted by these movable plates 95 against this flat so as to clamp the heating rod in the turning machine with the gang of fin plates 35 thereon positioned as shown in FIGS. 10 and 11.

The clamping fixture 100, with its two angle bars 101 and 102 spread apart is then placed over the clamped array of heating rod and the complement of fin plates 35 thereon and this clamping fixture 100 is then lowered so that its opposing ribs 106, 109 come into alignment with the notches 45' in the opposite ends 41 of the gang of fin plates 35. With this clamping fixture so positioned the operator then swings the several hand levers 114 counterclockwise as viewed in FIGS. 12–15, that is, from the dotted line position shown in FIG. 12 to the full line position shown in this figure. This, through the toggle link 112, draws the two angle bars 101 and 102 together and causes their ribs 106, 109 to enter the row of notches 45' at opposite edges 41 of the fin plates 35, this position of the parts being illustrated by full lines in FIG. 12.

The clamping fixture 100 is then rotated clockwise approximately 50° about the axis of the heating rod 25 to the position shown in FIG. 13. Since the heating rod 25 is held against turning and since the gang of fin plates 35 are held by this clamping fixture 100, this movement serves to rotate the gang of fin plates about the axis of the stationary heating rod 25 and henceforth the straight edges 48 of all of the fin plates 35 around the top bulge 32 and semicylindrical face 31 of the heating rod 25. Thus, starting with the position of the parts shown in FIG. 21, when this turning movement of the fin plates 35 held by the clamping fixture 100 has been completed, the parts are in the position shown in FIG. 22. There is, of course, a yield of the contacting metal of the heating rod 25 as well as of each fin plate 35 but such turning has been found to result in an excellent thermal conductive press fit between the edge of the hole 45 of each fin plate 35 and the entire rounding surface 31, 32 of the heating rod 25. In the completed unit, as best shown in FIG. 22, the only parts between each fin plate 35 and the heating rod 25 which are out of contact with one another are along the flat 30 of the heating rod and the adjacent parts of the curved edges 46 and straight edges 48 of the holes 45 in the several fin plates 35. Desirably this out of contact is not more than 90° of the periphery of the heating rod 25 and good thermal contact is not obtained if this out of contact space is less than 45°.

In the final movement of the clamping fixture 100 and its contained fins 35 axially around the heating rod 25, the cam faces 86 and 99 of the fixed upright cam plate 81 and movable cam plate 95 come into contact with the inner or opposing faces of the pairs of spacing tabs 40 on each fin plate. This spreads these spacing tabs still further apart from each other to the position illustrated at 119 in FIG. 20.

The clamping pressure of the group of movable plates 95 against the flat 30 on the heating rod 25 is then released so that the completed unit is freed from this clamping pressure against its heating rod 25. This position of the parts is illustrated in FIG. 14 and it will be seen that the clamping fixture 100 can now be swung counterclockwise back to its original position without destroying the pressure bond between the heating rod 25 and the several fin plates 35. This clamping fixture is then so rotated to the position shown in FIG. 15.

Considerable force is required to effect the good thermally conductive union between the heating rod 25 and the several fin plates 35 as above described. Accordingly mechanical force is required to lift the completed extended surface unit, still clamped between the angle bars 101, 102 of the clamping fixture 100, from among the many fixed and movable plates 81, 90, 92 and 95 of the turning machine. Accordingly the pry 116 is inserted under the bottom of the side flange 105 of the angle bar 101 and this pry moved so as to force this side of the clamping fixture 100 upwardly thereby to pull the clamped completed unit out from the upright plates of the turning machine. Following this the finger pieces 115 of the clamping fixture 100 are swung counterclockwise to expand the toggle linkage and spread apart the two angle bars 101, 102 thereby to remove their opposing ribs, 106, 109 from the notches 45' of the fin plates and to release the completed unit.

The invention provides an extended surface electrical heating unit having excellent thermal conductivity from the heating rod to its fins and from the fins to the surrounding air, at lower cost.

I claim:

1. In a method of making an extended surface electrical heating unit having an elongated electrical heating element housed within a filled tubular metal sheath and a plurality of individual metal fin plates surrounding said sheath and projecting transversely therefrom in spaced relation to one another; the improvement which comprises forming said sheath so as to be out-of-round in exterior cross section, forming a succession of said fin plates each with a hole conforming in outline to the out-of-round exterior cross section of said sheath, threading said succession of fin plates through their said holes onto said sheath to be positioned in spaced relation to one another, and turning said fin plates around the axis of and relative to said sheath so as to jam a portion of said outof-round exterior of said sheath against a portion of the rims of said out-of-round holes to effect pressure and good thermal conductivity contact between said sheath and each fin plate thereon.

2. The method set forth in claim 1 wherein said sheath and holes are D-shaped in exterior cross section and outline, respectively.

3. The method set forth in claim 2 wherein the chordal extent of the D-shape of said sheath and holes is between 45° and 90° of the circumference thereof.

4. The method set forth in claim 2 wherein said turning of said fin plates around the axis of and relative to said sheath is in the order of 50°.

5. The method set forth in claim 2 wherein the edge of said hole is in pressure and thermal conductivity contact with substantially the entire rounding part of the exterior surface of said sheath and is out of contact with substantially the entire flat part of the exterior surface of said sheath.

6. The method set forth in claim 1 wherein each plate has flat parallel opposite faces and wherein the thickness at the edge of its hole is substantially equal to the thickness thereof between said opposite faces.

7. In a method of making an extended surface electrical heating unit having an elongated electrical heating element housed within a filled tubular metal sheath and a plurality of individual metal fin plates surrounding said sheath and projecting transversely therefrom in spaced relation to one another; the improvement which comprises forming a succession of said fin plates each with both a hole conforming to the exterior cross section of said sheath and also with a spacing tab projecting laterally therefrom, threading its succession of said fin plates through their said holes onto said sheath with the spacing tab of each fin plate engaging the next succeeding fin plate thereby to effect uniform spacing of said fin plates, spreading said plates, lengthwise of said sheath, uniformly from one another to disengage said spacing tabs from said next succeeding fin plate, and thereafter uniting said sheath to the adjacent part of each fin plate whereby the connection between the several fin plates is solely through said sheath, and said spacing tabs do not become a source of noise as the unit expands and contracts thermally.

8. The method set forth in claim 7 wherein each fin plate is provided with a pair of said spacing tabs located on opposite sides of its said hole.

9. In a method of making an extended surface electrical heating unit having an elongated electrical heating element housed within a filled tubular metal sheath and a plurality of individual metal fin plates surrounding said sheath and projecting transversely therefrom in spaced relation to one another, the improvement which comprises forming a succession of said fin plates each with both a hole conforming to the exterior cross section of said sheath and also with a spacing tab projecting laterally therefrom, threading the succession of said fin plates through their holes onto said sheath with the spacing tab of each fin plate engaging the next succeeding fin plate thereby to effect uniform spacing of said plates, holding said group of fin plates, thereafter bending said tabs to disengage them from said next succeeding fin plates, and thereafter uniting said sheath to the adjacent part of each fin plate whereby the connection between the several fin plates is solely through said sheath, and said spacing tabs do not become a source of noise as the unit expands and contracts thermally.

10. The method set forth in claim 9 wherein each fin plate is provided with a pair of said spacing tabs located on opposite sides of its said hole.

References Cited

UNITED STATES PATENTS

| 1,865,444 | 7/1932 | Recker et al. | |
| 2,804,286 | 8/1957 | Antarelli | 165—182 |
| 3,311,148 | 3/1967 | Leitner | 29—521 X |
| 3,348,596 | 10/1967 | Leitner | 29—521 X |
| 3,373,803 | 3/1968 | Steinberg et al. | 29—157.3 X |

JOHN F. CAMPBELL, Primary Examiner

V. A. DI PALMA, Assistant Examiner

U.S. Cl. X.R.

29—157.3; 165—182